F. F. GROFF.
PANORAMIC ATTACHMENT FOR CAMERAS.
APPLICATION FILED DEC. 26, 1907.

908,091.

Patented Dec. 29, 1908.
2 SHEETS—SHEET 1.

WITNESSES:

Fred P. Mentzer.

Mabel L. Lefevre.

INVENTOR

Frederick F. Groff.

BY

Sterr & Thompson
ATTORNEYS.

F. F. GROFF.
PANORAMIC ATTACHMENT FOR CAMERAS.
APPLICATION FILED DEC. 26, 1907.
908,091.
Patented Dec. 29, 1908.
2 SHEETS—SHEET 2.
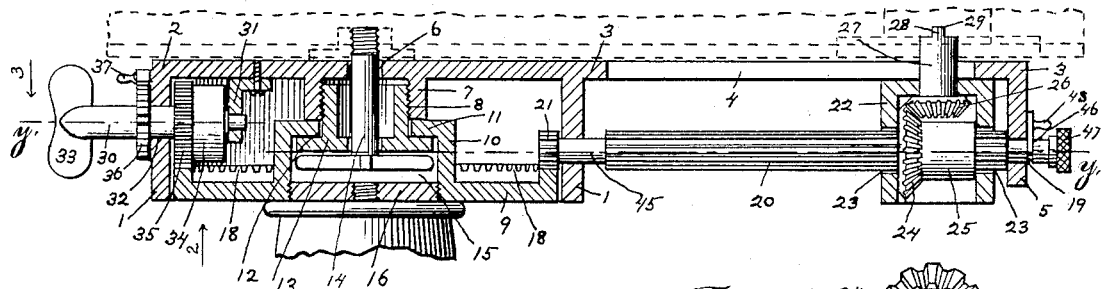
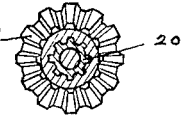
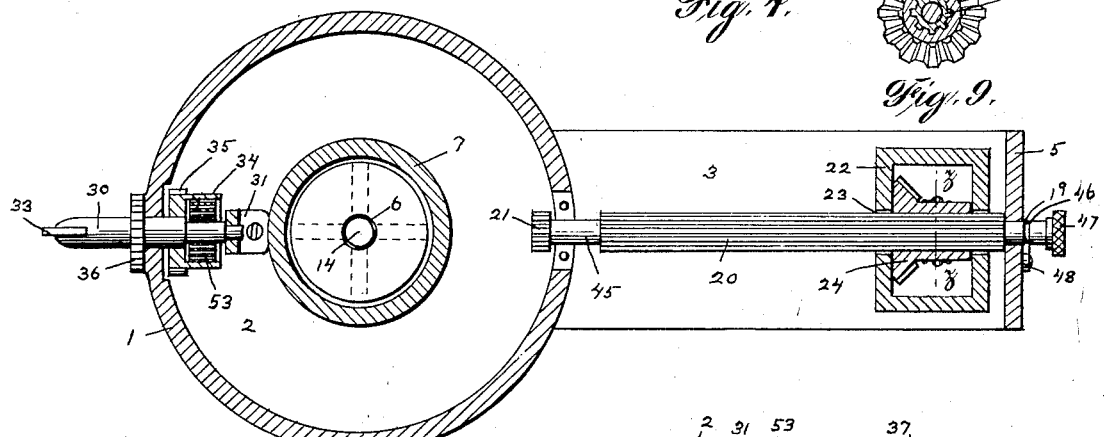
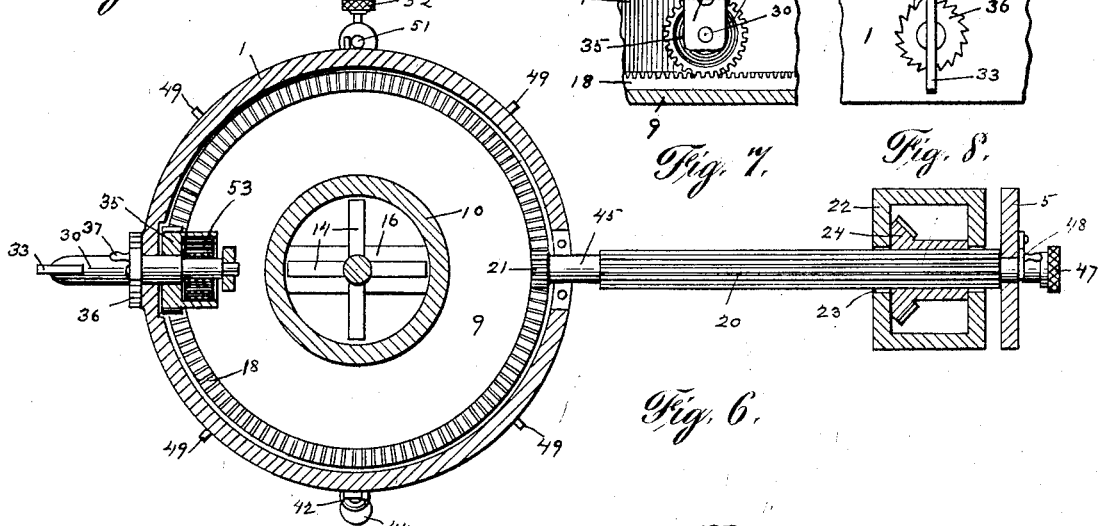
WITNESSES:
INVENTOR
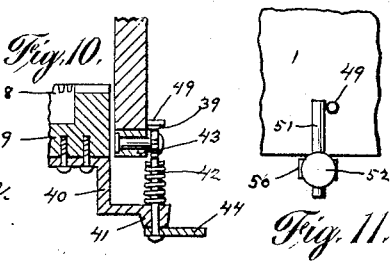
Frederick F. Groff.
BY
Herr & Thompson
ATTORNEYS.

UNITED STATES PATENT OFFICE.

FREDERICK F. GROFF, OF LANCASTER, PENNSYLVANIA.

PANORAMIC ATTACHMENT FOR CAMERAS.

No. 908,091.     Specification of Letters Patent.     Patented Dec. 29, 1908.

Application filed December 26, 1907. Serial No. 408,106.

*To all whom it may concern:*

Be it known that I, FREDERICK F. GROFF, a citizen of the United States, residing at Lancaster, in the county of Lancaster and State of Pennsylvania, have invented certain new and useful Improvements in Panoramic Attachments for Cameras, of which the following is a specification, reference being had therein to the accompanying drawing.

My invention relates to a panoramic attachment for cameras that may be attached to any of the usual styles of camera using a film spool, and of any size, as my attachment is so constructed that it is universal, and by its use converts any size of film camera into a panoramic camera, and is attached to the camera in the same way as the tripod, and between the camera and the tripod, and is adapted to revolve the camera, partly or completely upon a vertical axis, during the time of exposure, and at the same time to revolve the film storage spool in such manner that the film is advanced across the exposure opening at the same rate of speed as the camera is turned and of sufficient length to correspond to the arc through which the camera is revolved, and by a special construction and combination of parts I provide, in an automatic manner, for a decrease in the speed at which the camera is revolved to compensate for the increased speed at which the film is advanced owing to the increasing diameter of the film spool as the film is wound upon it. This I believe is a feature never before attained in devices of this class without the use of cones, escapement wheels, etc.

The object of my invention is to produce a simple, inexpensive, and easily attached device that will fit any style or size of camera, that may be quickly attached or detached and that is so compact that it may be carried in the operator's pocket. My device may also be operated by hand or by a self-contained spring motor, and it may be set to revolve through any predetermined number of degrees of a circle.

With this and other objects in view I have here illustrated and described my invention as applied to a folding camera using film rolls.

In the following drawings like reference figures indicate corresponding parts in all the views.

Figure 1:
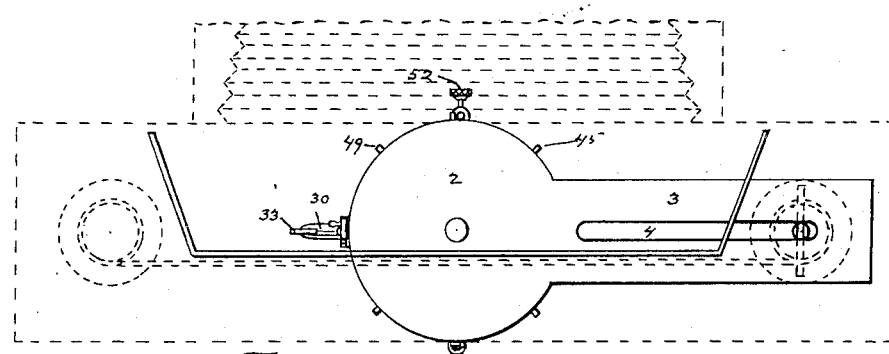
Figure 2:
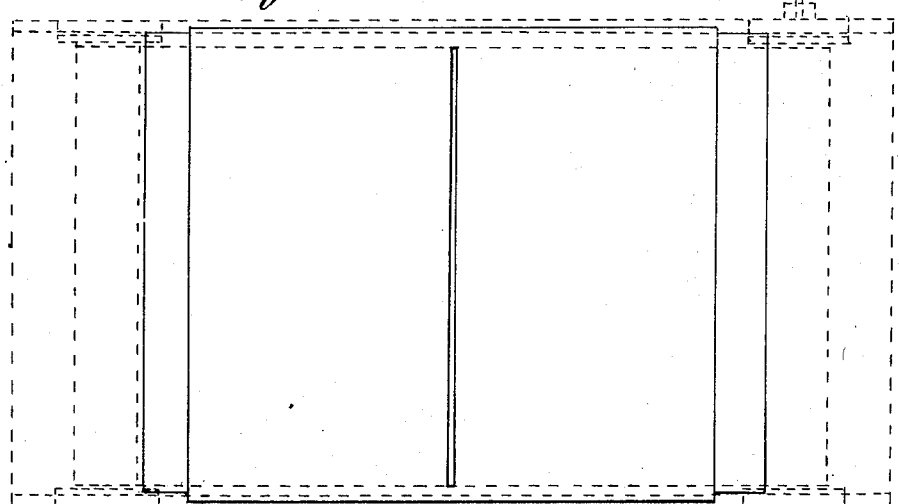
Figure 3:
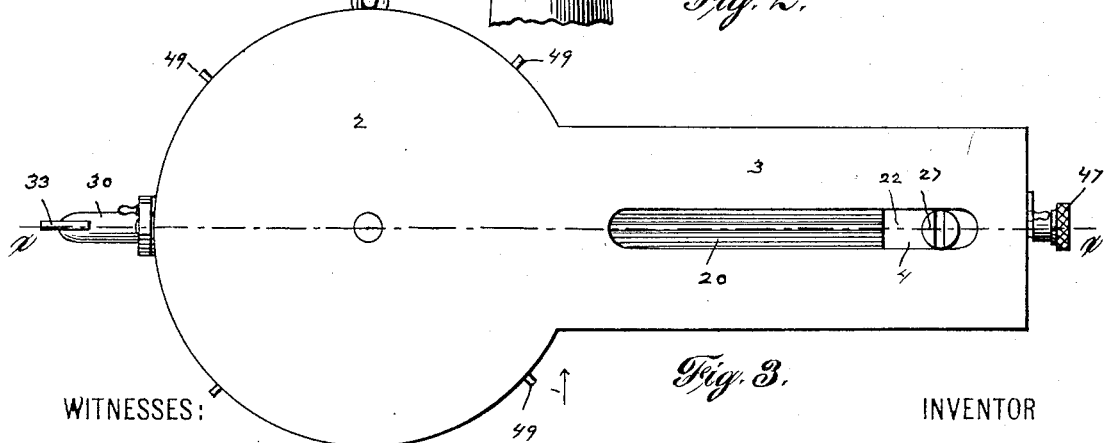

Figure 1, is a partial top plan view of a camera shown in dotted lines, showing my device in position and the film shield in place. Fig. 2, is a rear elevation of the same. Fig. 3, is a top plan view of the attachment with the camera removed. Fig. 4, is a side elevation of Fig. 3, in section on the line $x$, $x$ viewed from the direction of the arrow 1. Fig. 5, is a plan view in section on the line $y$, $y$, of Fig. 4, as viewed in the direction of the arrow 2. Fig. 6, is a plan view in section on the line $y$, $y$, of Fig. 4, as viewed in the direction of the arrow 3. Fig. 7, is a detail view of the spring motor as viewed from within the case. Fig. 8, is a detail view of the winding ratchet and key as viewed from the outside of the case. Fig. 9, is a detail view in section of the sliding gear and shaft on the line $z$, $z$, of Fig. 5. Fig. 10, is a detail sectional view of the release catch. Fig. 11, is a detail side elevation of the stop catch device. Fig. 12, is a detail sectional view of the stop catch device.

In the drawings: 1, indicates a circular case, formed with the circular top 2, and the extending arm 3, integral and on the same plane as said top and containing the bearing slot 4, extending longitudinally for a distance through its center, said arm terminating at its outer end in the bearing bracket 5, extending downward at right angles from its under surface. The center of the top of said case is provided with the bolt orifice 6, and the downwardly extending tubular boss 7, concentric with same, and provided on its inner surface with the screw-thread 8.

Rotatably mounted within the lower part of the case 1, is the circular support 9, which is provided with the concentric extension 10, extending from its upper surface and which is formed with the circular top 11, pierced at the center by the hole 12. The upper surface of said top 11, is held in rotatable contact with the lower surface of the boss 7, and within the case 1, by the hollow nut 13, which is screw-threaded into said boss 7, and has the upper surface of its projecting head in contact with the under surface of the top 11, thus retaining the case and the supporting plate 9, in a rotatable manner, one upon the other. The cross-headed finger bolt 14, extends upwards through the center of the hollow nut 13, and the orifice in the case top 6, and is screw-threaded into the bottom of the camera in place of the usual tripod screw, while within the orifice 15, formed by the extension 10, is screw-threaded the tripod bar 16, by threads cut upon its ends, and to the center of which is secured the tripod in the same manner as to the camera. Upon the upper surface of the supporting plate 9, near its outer edge are placed the gear teeth 18, in the form of a crown gear.

Rotatably mounted in the bearings 19 formed in the extending arm 3, and 45, in the case 1, on a line with the center of, and under the extending arm 3, is the shaft 20, formed with teeth its entire length except where cut away to form bearing surfaces, where it rotates within the bearings 19, and 45, the teeth within the case 1, forming a pinion 21, which mesh with the teeth of the crown-gear 18. The bearing surfaces of the shaft 20, are somewhat longer than the bearings 19, and 45; its outer bearing being encircled by the groove 46, and terminating in the finger nut 47, while the pawl 48, is secured to the outer surface of the bearing extension 5, and is adapted to engage the groove 46, and retain said shaft 20, from sliding inwardly. Mounted upon the shaft 20, is the gear-case 22, which is slidably mounted upon said shaft 20, with its upper surface in contact with the under surface of the extending arm 3; the holes 23, in said gear-case 22, being of sufficient diameter to allow the teeth of the shaft 20, to freely rotate therein.

Within the gear-case 22, and upon the shaft 20, is mounted the bevel-gear 24, which is formed with the hub 25, with its ends in contact with the inner sides of said case and having its axial hole toothed to correspond to the teeth of said shaft, so that it will freely slide upon said shaft and at the same time be rotated by said shaft. Mounted within the upper part of said gear-case is the bevel-gear 26, which meshes with and is rotated by the bevel-gear 24, and has extending upward through and slightly above the top of said case and through the slot in the extending arm 3, the post 27, which terminates in the lug 28, which is adapted to enter the bottom of the camera and engage a slot 29, provided in the bottom of the film spool, thus rotating said film spool as said gear is rotated.

Mounted within the case 1, at any convenient point of its circumference is the motor shaft 30, with its inner end rotatably secured in the bearing bracket 31, secured to the lower surface of the top 2, and its outer end extending through a bearing 32, in the side of said case 1, and terminating in a winding key 33. Rotatably mounted upon said shaft 30, between the bearing bracket 31, and the case 1, is the motor drum 34, upon the outer circumference of which are the gear teeth 35, which mesh with the teeth of the crown-gear 18. Secured to the shaft 30, within said drum 34, is the inner end of a motor spring 53, which is wound about said shaft 30, with its outer end secured to the inner surface of said drum 34, in such a manner that when said drum 34, is retained from revolving upon the crown-gear by a device hereinafter more fully explained, and the motor shaft 30, is revolved by the key, the motor spring will be coiled about said shaft under tension. Mounted upon said shaft 30, without the case 1, and securely keyed to said shaft is the ratchet wheel 36, which is engaged and held by the pawl 37, so that the key will freely rotate it in a winding direction, and it will be retained from unwinding by said ratchet wheel and pawl unless released.

Mounted upon the lower surface of the supporting plate 9, near its edge at any desired point on its circumference is secured the bracket 40, formed with the extending bearing 41, through which extends upward the pin 42, which carries at its upper end the roller 43, which is adapted to roll upon the lower edge of said case 1, and engage the notch 39, in the lower edge of the case 1, thus retaining said case 1, from rotating upon said supporting plate until released by pressing down on the finger point 44.

At desired points on the periphery of the case 1, are placed the stop pins 49, arranged in the form of steps or each on a higher plane than the preceding one, and at any desired point on the lower surface or edge of the supporting plate 9, is mounted the bracket 50, in the end of which is slidably mounted the stop finger 51, which can be secured at any desired height by the set-screw 52.

The attaching and operation of my device is as follows: The device is secured to the camera bottom by the cross-headed finger bolt which is passed through the hollow nut and bolt orifice in the case top and screw-threaded into the tripod socket in the camera, the spool winding post first having been adjusted in the slotted extending arms to conform to the location of the film spool in the camera and secured to the end thereof; the sliding adjustment of the shaft and gear-case allowing of adjustment for cameras of different sizes. The tripod bar is now secured into the orifice in the bottom of the supporting plate and the tripod secured in place thereto. The arc of the circle through which the camera is to travel having been determined, and the camera having been focused by pushing in the shaft 20, thus disengaging the pinion from the teeth of the crown-gear and allowing the camera to be rotated without operating the film spool, the stop finger is now raised and set so that it will pass by the intermediate stop pins and engage the stop pin at the desired stopping point on the periphery of the case. The camera is now swung to the extreme left or until the release catch engages the starting notch. The spring motor is now wound up, the lens of the camera opened, the release pin pressed down, thus allowing the drum to revolve and travel on the crown-gear revolving the case and camera on the supporting plate, and at the same time rotating the pinion and bevel-gear, and film spool, thus winding up the film upon said spool, until the stop catch comes into engagement with the stop pin it is set for, when the rotation of the camera is stopped and also that of the film.

While I have herewith described my invention as illustrated, it is understood that slight changes may be made in the construction and arrangement of the parts without departing from the spirit of the invention.

Having thus described my invention, what I claim as new and desire to secure by Letters Patent is:—

1. A panoramic attachment for cameras of the class described, comprising a circular case; an extending arm integral with said case; a circular support rotatably mounted within said case; a hollow circular boss concentric with and extending downward from the top of said case and integral therewith; a hollow circular boss concentric with and extending upward from the said circular support and integral therewith; a circular cap formed upon said upwardly extending boss and provided with a concentric hole; a hollow flange-headed nut passed through the hole in said boss and screw-threaded into the boss upon said case top, with the under surface of its flanged head in contact with the under surface of the cap upon said supporting boss, for the purpose set forth.

2. A panoramic attachment for cameras of the class described, comprising a circular case; an extending arm integral with said case; a circular support concentric with and rotatably mounted within said case; a hollow circular boss concentric with and integral with the lower surface of said case; a hollow circular boss concentric with and integral with the upper surface of said support; a hollow nut rotatably securing said case boss upon said supporting boss; a cross-headed finger bolt extending upward through said nut and case top and screw-threaded into the camera; a tripod plate formed with threads upon its ends and adapted to be screw-threaded into the bottom of the supporting boss; and provided with a central screw-threaded hole for the reception of the tripod screw; for the purpose set forth.

3. A panoramic attachment for cameras of the class described, comprising a circular case formed with a circular top provided with an extending arm; a circular supporting plate concentric with and rotatably secured within said case; having an orifice formed in the center of said support bottom; a tripod bar screw-threaded within said orifice; a motor shaft rotatably journaled in the side of said case; a motor drum rotatably mounted upon said shaft within said case; gear teeth formed on the outer surface of said drum; a crown-gear formed upon the upper surface of the supporting plate, meshing with the teeth upon said drum; a motor spring contained within said drum, having its inner end secured to said shaft and its outer end secured to the inner surface of said drum; a ratchet wheel rigidly secured upon said shaft without said case; a pawl secured to the outer surface of said case and adapted to engage said ratchet wheel; for the purpose set forth.

4. A panoramic attachment for cameras of the class described, comprising a circular case formed with an extending arm, and rotatably secured upon a circular supporting plate; a crown-gear formed upon the upper surface of said supporting plate; a spur-gear meshing with said crown-gears; a drum integral with said spur-gear, a winding shaft rotating within said drum and extending through the side of said case; a bracket secured to the under surface of said supporting plate near the edge thereof; a bearing formed in the end of said bracket; a rod slidably mounted vertically in said bearing; a finger clip secured to the lower end of said rod; a coiled spring embracing said rod between the bearing and the top of said rod; a roller mounted upon the top of said rod and adapted to rotate in contact with the lower edge of the case side; a notch formed in the lower edge of said case side and adapted to receive said roller; for the purpose set forth.

5. A panoramic attachment for cameras of the class described, comprising a circular case detachably secured to the tripod-socket of the camera; a supporting plate detachably secured to the tripod; means for securing said case upon said supporting plate in a rotatable manner; a notch formed in the lower edge of the side of said case; a release rod mounted in a bearing bracket secured to said supporting plate and adapted to engage said notch; a series of stop pins secured upon the outer surface of said case side at varying heights and points upon its circumference; a bracket formed with a vertical hole and secured to the under surface of said supporting plate near its edge; a slidable rod secured within said hole; by a set screw, screw-threaded into said bracket at right angles to said pin; for the purpose set forth.

6. A panoramic attachment for cameras of the class described, comprising a circular case formed with an extending arm, having a longitudinal slot; a vertical bearing-bracket depending at right angles from the end of said arm and integral therewith; a bearing formed in the side wall of said case opposite said bearing-bracket; a shaft rotatably and slidably mounted in said bearings, and formed with gear teeth extending its entire length except where it revolves in said bearings; a sliding gear-case mounted upon said shaft and having its top in slidable contact with the under surface of said extending arm; a bevel gear formed with longitudinal gear teeth extending through its axial hole, slidably mounted upon said shaft within said gear case; a bevel-gear meshing with said sliding gear and mounted within said gear-case near its top; a post extending through and rotating within said longitudinal slot, and integral with said bevel-gear; a transverse web formed upon the upper end of said post and adapted to engage the film spool of the camera; a groove formed upon the circumference of said shaft near its outer end; a catch secured to the outer surface of said bearing-bracket and adapted to engage said groove; for the purpose set forth.

In testimony whereof I affix my signature in presence of two witnesses.

FREDERICK F. GROFF.

Witnesses:
ROBERTS APPEL,
MABEL L. LEFEVRE.